(12) United States Patent
Koren (10) Patent No.: US 6,791,101 B2
(45) Date of Patent: Sep. 14, 2004

(54) SCANNING APPARATUS (75) Inventor: Jacob Koren, Haifa (IL)

(73) Assignee: Orex Computed Radiography Ltd., Yokneam (IL)

( * ) Notice: Subject to any disclaimer, the term of this patent is extended or adjusted under 35 U.S.C. 154(b) by 0 days.

(21) Appl. No.: 10/456,396

(22) Filed: Jun. 5, 2003

(65) Prior Publication Data

US 2003/0201411 A1 Oct. 30, 2003

Related U.S. Application Data (63) Continuation of application No. 09/928,291, filed on Aug. 2, 2001, now Pat. No. 6,624,438, which is a continuation-in-part of application No. 09/253,983, filed on Nov. 18, 1998, now Pat. No. 6,291,831.

(30) Foreign Application Priority Data

Nov. 20, 1997 (IL) .................................................. 122269

(51) Int. Cl.[7] .......................... G03B 42/00; G01T 1/105
(52) U.S. Cl. ......................... 250/584; 250/585; 250/586
(58) Field of Search ................................. 250/584, 585, 250/586, 484.4, 236; 354/201, 212, 220; 358/493

(56) References Cited

U.S. PATENT DOCUMENTS

| | | | |
|---|---|---|---|
| 3,651,256 A | 3/1972 | Sherman et al. |
| 4,293,864 A | 10/1981 | Scott |
| 4,302,671 A | 11/1981 | Kato et al. |
| 4,543,479 A | 9/1985 | Kato |
| 4,582,989 A | 4/1986 | Agano |
| 4,595,957 A | 6/1986 | Holthusen |
| 4,631,407 A | 12/1986 | Kawajiri et al. |
| 4,692,813 A | 9/1987 | Conrad et al. |
| 4,816,923 A | 3/1989 | Saotome |
| 4,829,180 A | 5/1989 | Goto et al. |
| 4,882,488 A | 11/1989 | Hashiue |
| 4,886,968 A | 12/1989 | Ohnishi et al. |
| 4,973,134 A | 11/1990 | Finkenzeller et al. |
| 5,003,570 A | 3/1991 | Whiting |
| 5,047,643 A | 9/1991 | Ogura |
| 5,136,157 A | 8/1992 | Apter et al. |
| 5,365,562 A | 11/1994 | Toker |
| 5,396,081 A | 3/1995 | Ogura et al. |
| 5,508,837 A | 4/1996 | Gangstead et al. |
| 5,635,728 A | 6/1997 | Cantu et al. |
| 5,874,744 A | 2/1999 | Goodman et al. |
| 5,900,640 A | 5/1999 | Ogura |
| 6,028,321 A | 2/2000 | Rantanen |
| 6,291,831 B1 | 9/2001 | Koren |
| 6,418,190 B1 | 7/2002 | Yokozawa et al. |

FOREIGN PATENT DOCUMENTS

| | | |
|---|---|---|
| JP | 1-105935 A | 4/1989 |
| JP | 6019014 A2 | 1/1994 |
| WO | WO 94/27167 A1 | 11/1994 |

Primary Examiner—Scott J. Sugarman
Assistant Examiner—Richard Hanig
(74) Attorney, Agent, or Firm—Wolf, Greenfield & Sacks, P.C.

(57) ABSTRACT

Methods and apparatus for directing radiation to and from a sample to be scanned. In one example, first radiation propagating along a first axis is reflected off of the first axis so as to impinge on the sample. In response to the first radiation, the sample emits second radiation, which is directed to a detector. In one aspect, the second radiation is received directly from the sample by a reflector, which reflects the second radiation such that it travels substantially through air to impinge on the detector. In another aspect, the second radiation is directed such that it travels toward the detector in a direction having a significant vector component parallel to the first axis. In yet another aspect, a detection surface of the detector is oriented essentially perpendicular to the first axis and adapted to detect at least some of the second radiation traveling in a direction non-parallel to the first axis.

72 Claims, 8 Drawing Sheets

SCANNING APPARATUS

CROSS-REFERENCES TO RELATED APPLICATIONS

This application is a continuation (CON) of U.S. Ser. No. 09/928,291, filed Aug. 2, 2001 now U.S. Pat. No. 6,624,438, which is a continuation-in-part (CIP) of U.S. Ser. No. 09/253,983, filed Nov. 18, 1998, now U.S. Pat. No. 6,291,831 each of which applications is incorporated herein by reference.

FIELD OF THE INVENTION

This invention relates generally to an axially oriented optical system and more particularly to a system using a radial rotating light beam for scanning a medium mounted on a fixed cylindrical member.

BACKGROUND

Previously, scanners of X-ray exposed phosphor plates performed their function on a flat-bed or the external surface of a rotating drum. These systems have problems that increase the cost and reduce the quality of the X-ray image. The undesirable results obtained with a flat-bed or rotating drum system are caused by the continuous changing of the angles and distances of the light beam paths used for stimulating the phosphor of the X-ray exposed phosphor plates. Also, the collection of the stimulated light is performed with a different path and angle for each position on the phosphor plate, thereby requiring complicated, expensive compensation with a resultant reduction in quality. Additionally, the complications with attendant increases in cost are exacerbated when existing systems for supporting the phosphor plates do not maintain a fixed positioning during the scanning procedure.

Apparatus for radiation image read-out are known and are described, for example, in U.S. Pat. Nos. 4,886,968 and 5,396,081.

An optical system for an internal drum readout apparatus using a radial rotating light beam, which provides for minimizing distortion together with a reduction of cost and complexity cannot be found in the art.

Neither the prior art devices nor contemplated solutions for their deficiencies are capable of resulting in a digitizer apparatus providing a combination of reduction in cost with an increase in accuracy and quality.

SUMMARY

In view of the aforementioned drawbacks of the conventional scanner systems, this invention provides a scanning system with a novel on-axis optical system to minimize distortion and avoid complex compensation introduced by currently used arrangements, while at the same time achieving cost reduction.

In addition, a light beam scanning system for digitizing X-ray exposed phosphor plates for storage and/or image display is provided.

There is thus provided, in accordance with a preferred embodiment of the present invention, a scanning apparatus, which includes a medium attached to a surface of a fixed, hollow cylindrical segment, the fixed, hollow cylindrical segment having a first longitudinal axis, a rotational radial laser beam rotating around the first longitudinal axis and arranged to scan said medium, and a light sensitive detector having a light acceptance direction along a second axis coinciding with the first longitudinal axis of the cylindrical segment.

Further, in accordance with a preferred embodiment of the present invention, the apparatus further includes at least one reflector for directing the beam towards the medium. The apparatus further includes transport apparatus for rotating and translating the laser beam.

Further, in accordance with a preferred embodiment of the present invention, the medium is a phosphor plate.

Further, in accordance with a preferred embodiment of the present invention, the reflecting unit may be a slanted mirror fixedly mounted for movement with the transport apparatus. A hole may be formed in the center of the slanted mirror for directing the laser beam therethrough. Furthermore, in accordance with a preferred embodiment of the present invention, the slanted mirror forms an angle in the range of 30–60 degrees relative to the longitudinal axis. The slanted mirror may be concave.

Further, in accordance with a preferred embodiment of the present invention, the apparatus further includes a rotating shaft, the laser beam being attached to the rotating shaft, wherein power is directed via slip rings attached to the rotating shaft.

Further, in accordance with a preferred embodiment of the present invention, the apparatus further includes a hollow shaft providing a beam path from the light source to the hole, and a mirror fixedly mounted in the hole for movement with the transport and rotated with the shaft for presentation of the beam along a radial from the axis to the medium.

Also, in accordance with a preferred embodiment of the present invention, the apparatus further includes a Fresnel lens mounted within the hollow cylindrical segment and proximate to the concave interior of the hollow cylindrical segment. The Fresnel lens has a longitudinal axis perpendicular to the longitudinal axis of the hollow cylindrical segment and the Fresnel lens has a hole formed in the center thereof to allow the beam and the receiving light emanating from the medium to pass through undisturbed.

Further, in accordance with a preferred embodiment of the present invention, the light emanating from the medium is refracted by the Fresnel lens the refracted light being reflected by the slanted mirror through the detector.

In addition, in accordance with a preferred embodiment of the present invention, there is also provided a scanning method. The method includes:

attaching a medium to a surface of a fixed, hollow cylindrical segment, having a first longitudinal axis;

arranging a rotational radial laser to rotate around the first longitudinal axis beam to scan the medium; and detecting the rays reflected from the medium along a second axis, said second axis coinciding with the first longitudinal axis.

These and other advantages, features and objects will become more apparent from the following description taken in connection with the illustrative embodiments in the accompanying drawings.

BRIEF DESCRIPTION OF THE DRAWINGS

An axially oriented optical system in accordance with the present invention will be described infra with respect to the accompanying drawings, which are not drawn to scale, of which.

DETAILED DESCRIPTION

Figure 1:
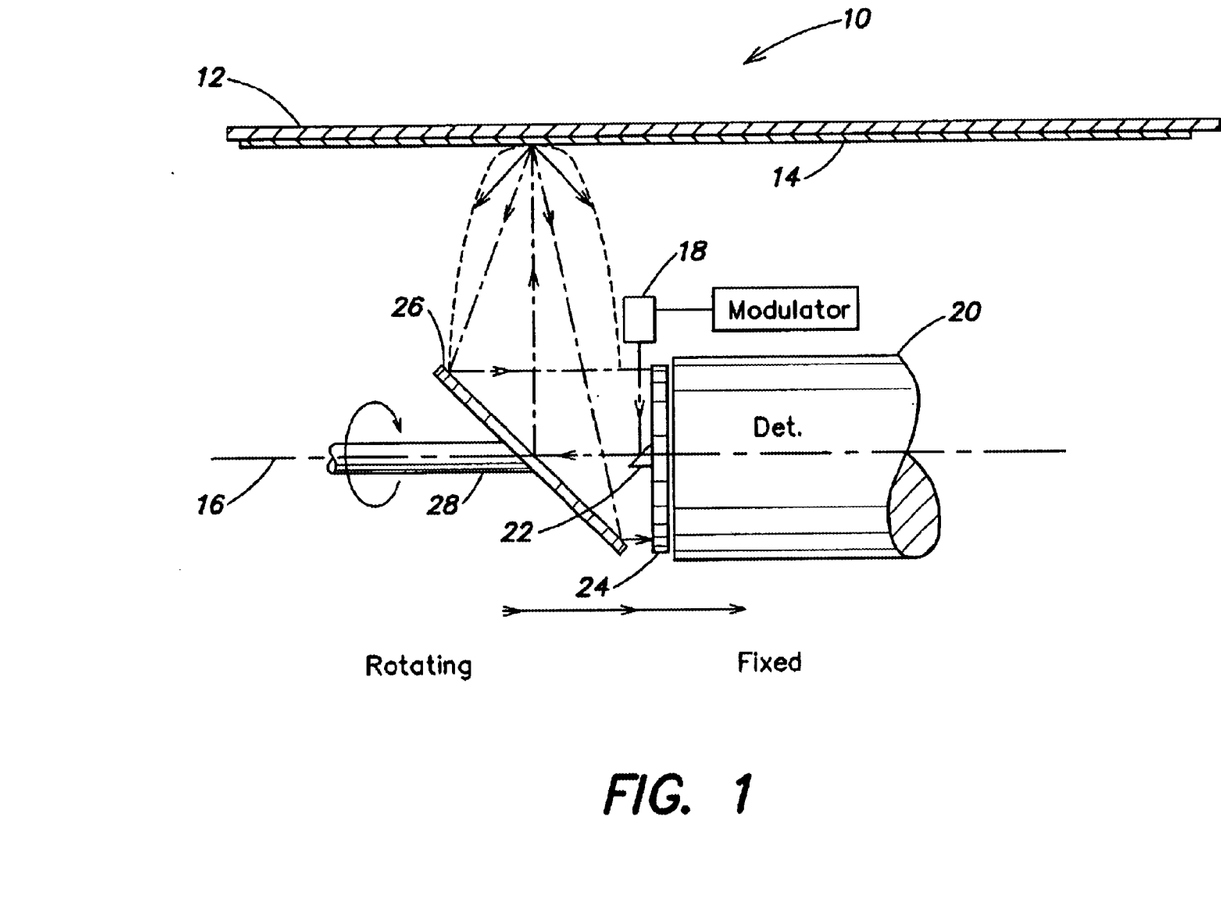
FIG. 1 is a schematic representation of one embodiment or arrangement of the optical system of this invention.

Reference is now made to FIG. 1, which illustrates an embodiment of the present invention in which a system for scanning a medium mounted on a fixed cylindrical member is shown The scanning apparatus 10 comprises a hollow cylinder 12 on the internal face of which is mounted a scanning medium 14. The light beam for scanning is rotated, as will be described hereinbelow, against the fixed hollow cylinder 12.

FIG. 1 shows a portion or segment of hollow cylinder 12 for shaping a medium, such as a phosphor plate 14, on the internal face of the cylinder for a scanning procedure. The longitudinal, central axis 16 of the portion of the cylinder 12 forms the main axis of the optical system of the scanning apparatus 10. Thus, when the phosphor plate 14 is located against and conforms to the internal cylindrical shape of the hollow, cylinder segment 12, the axis of the phosphor plate 14 is collinear with axis 16. As is usual with apparatus of this type, the phosphor plate is required to be enclosed to eliminate light other than that required for its function. Since the enclosure is not part of the inventive concept of this invention, it is not shown in the interest of clarity.

The optical system of the scanning apparatus 10 includes a focused laser light source 18 having its peak wavelength at a suitable level (preferably approximately 635 nm) in order to stimulate the phosphor plate 14 and a light sensitive detector 20, for example, a photomultiplier tube for converting the stimulated light with a peak wavelength of 390 nm emitted from the phosphor plate 14 into electric signals. The laser beam is directed, as shown by the arrowed line, at a small mirror 22 located and affixed at the center of the detector 20, for example, by gluing it to a filter 24 of the Schott type that blocks the laser beam wavelength and allows only passage of the 390 nm stimulated light emitted from the phosphor plate 14. The small mirror 22 directs the laser light source beam 90 degrees along the axis 16 of the cylinder segment 12 to the center of a rotating mirror 26, whose rotation is about the axis 16, and is angled with respect to axis 16 to direct the laser beam along the radius from axis 16 to the phosphor plate 14 on the interior of cylinder 12. Of course, if small lasers were used, they could be mounted on the filter 24 in place of small mirror 22. The optimal angle of the rotating mirror 26 depends on the type of mirror being used. For example, for a flat rotating mirror shown in the embodiment of FIG. 1, having the dual function of reflecting both the stimulating light and stimulated light, the angle should be preferably be 45 degrees.

The light source 18, filter 24 with small mirror 22 and detector 20 remain fixed against rotation, while angled or slanted mirror 26 and its shaft 28 are rotated together. At the point of stimulation of the phosphor plate 14, the stimulated light at 390 nm is directed, as shown by the arrowed beam lines, back toward the slanted, rotating mirror 26 for passage through the filter 24 to the detector 20 for conversion to an electronic signal for digitalization, as will later be described.

The optical items 18 through 28 are to be moved in translation so that the beam from the light source traverses the fixed phosphor plate 14, for example, in the direction of the arrows below the figure while the focused beam either creates arcs of circles or, if desired, a helix during the traverse.

Figure 2:
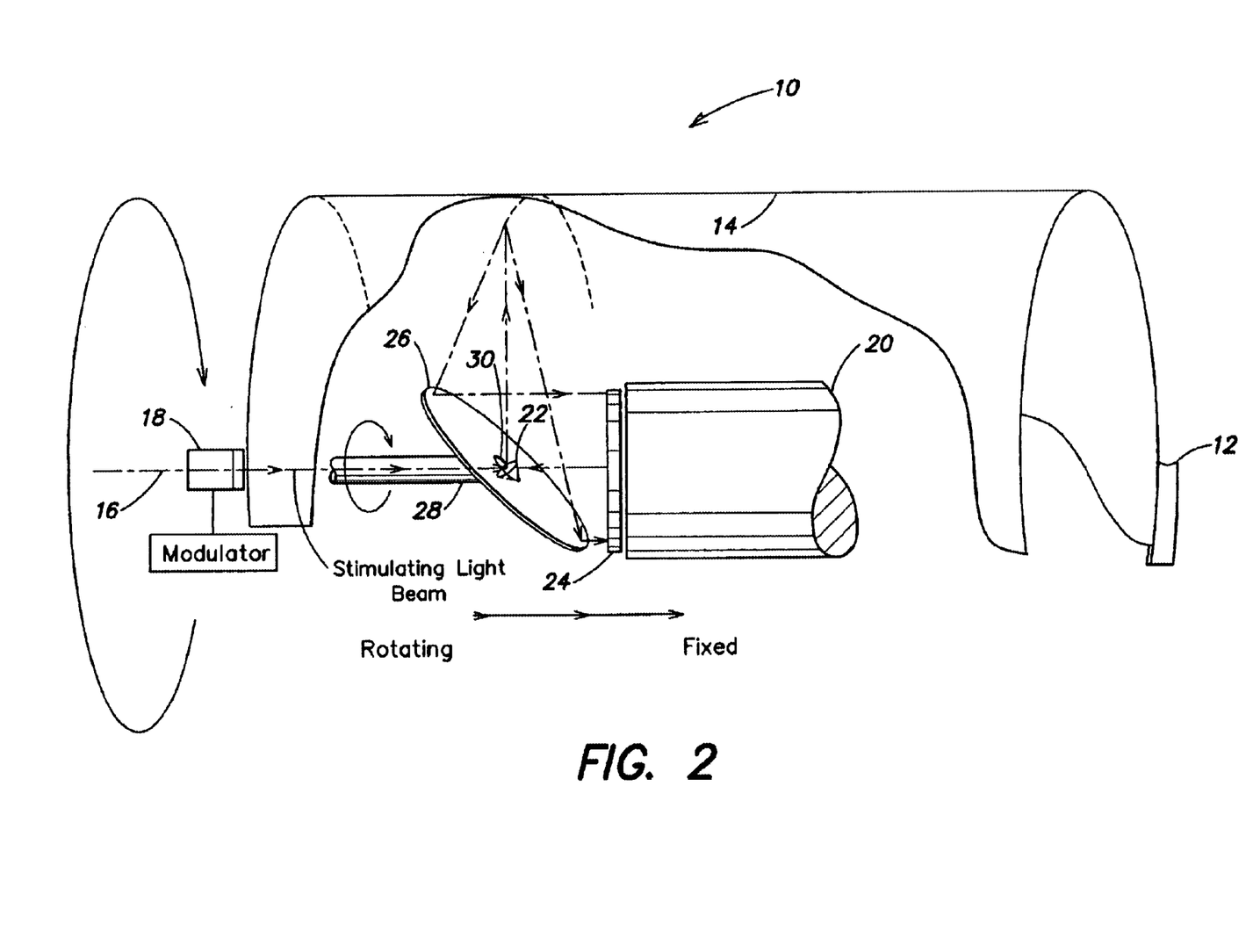
FIG. 2 is a schematic representation of an alternative arrangement of the optical system of this invention.

FIG. 2 illustrates a further embodiment of the present invention. FIG. 2 schematically represents an alternative arrangement whereby the light source 18 lies on axis 16 of shaft 28, which is collinear with the hollow cylinder portion 12, which forms the support for phosphor plate 14. In this application the shaft is hollow to allow the passage of the beam therethrough, and the angled rotating mirror 26 has a hole 30 at its center for allowing the passage of the beam to small mirror 22, which is mounted within the hole. Mirror 22 need not be the exact shape as illustrated. For example, it could be a penta prism or other optic arrangement that will perform the same result as the small mirror 22.

In this embodiment, the angle of the rotating mirror 26 may be adjusted to suit the s type of mirror being used. For instance, if rotating mirror is flat, the mirror may be angled at any suitable angle depending on the size of the mirror and preferably is within the range of 30–60 degrees. Alternatively, rotating mirror 26 may be an alternative shape, such as concave.

Figure 3:
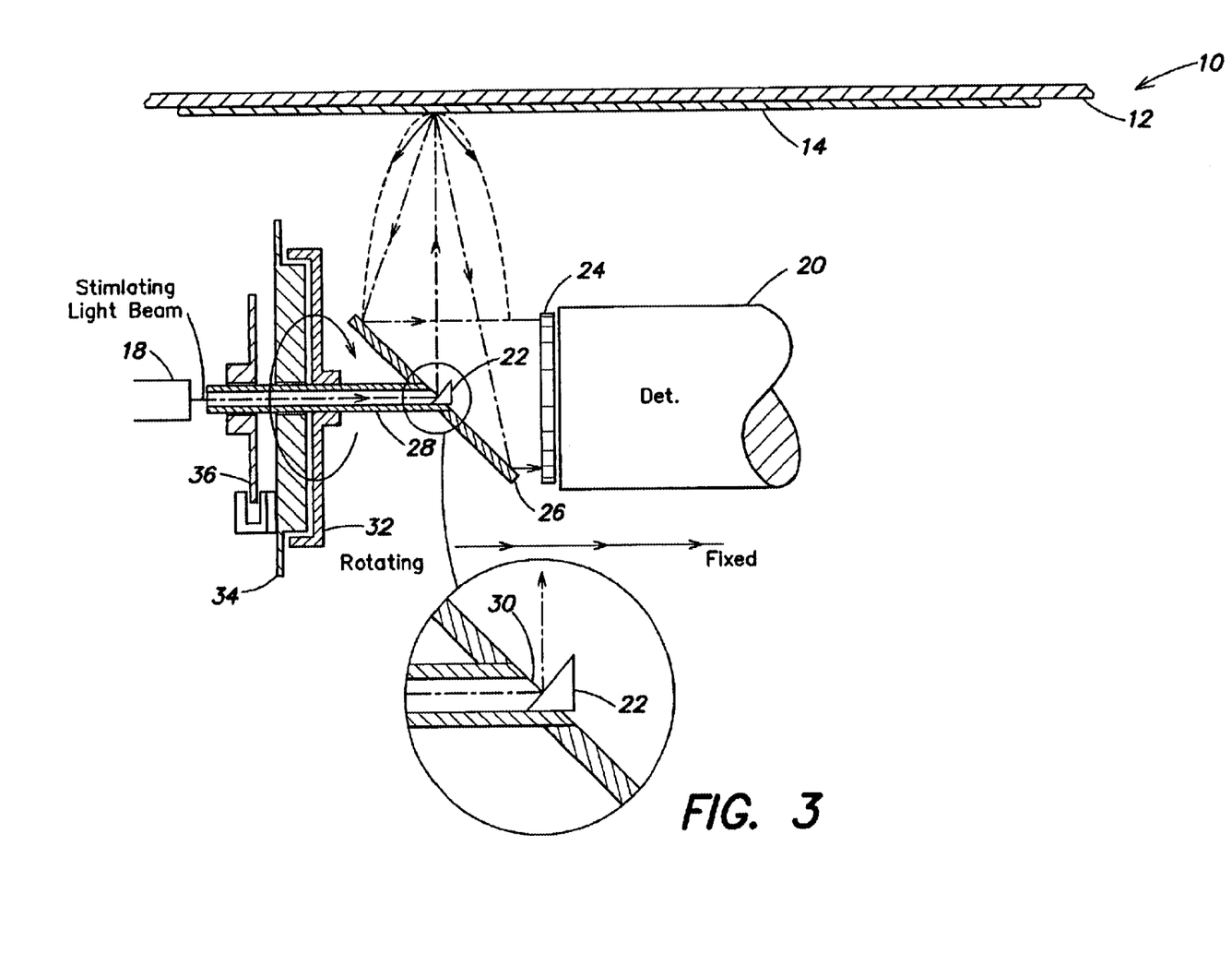
FIG. 3 is a schematic view of the embodiment of FIG. 2 with a rotative drive and encoding system that is applicable to all embodiments.

FIG. 3A illustrates the embodiment of FIG. 2 with the addition of a conventional motor mechanism comprising rotor 32, mounted for rotation with shaft 28, and a fixed stator 34. In the embodiments of FIGS. 1, 2 and 3 the filter 24 and detector 20 do not rotate. A conventional on-axis optical encoder system 36 is also mounted with respect to the motor for providing feedback pulses to stabilize rotation speed and for determining the beam positioning.

Reference is now made to FIG. 3B which illustrates a further embodiment of the present invention, which is similar to the embodiments of FIGS. 2 and 3A, except that mirror 26 is omitted. In this embodiment, the beam passes through the hollow shaft 28 to the small mirror 22, which is mounted, as shown in FIG. 3A, at the end of the chamfered hollow shaft. The beam is reflected (B1) at right angles towards the scanning medium 14. Some of the stimulated light, illustrated by the angle between beams B2 and B3, is directed back towards the detector 20 (via filter 24). By altering the size of the detector the amount of collected light may be varied.

In a further alternative embodiment, at least one reflector may be optionally added, as illustrated, for exemplary purposes only, by curved reflectors 152. As will be appreciated by persons knowledgeable in the art, the shape, size and number of reflectors may be altered so as to direct the desired pre-determined amount of light towards detector 20.

Figures 4A, 4B:
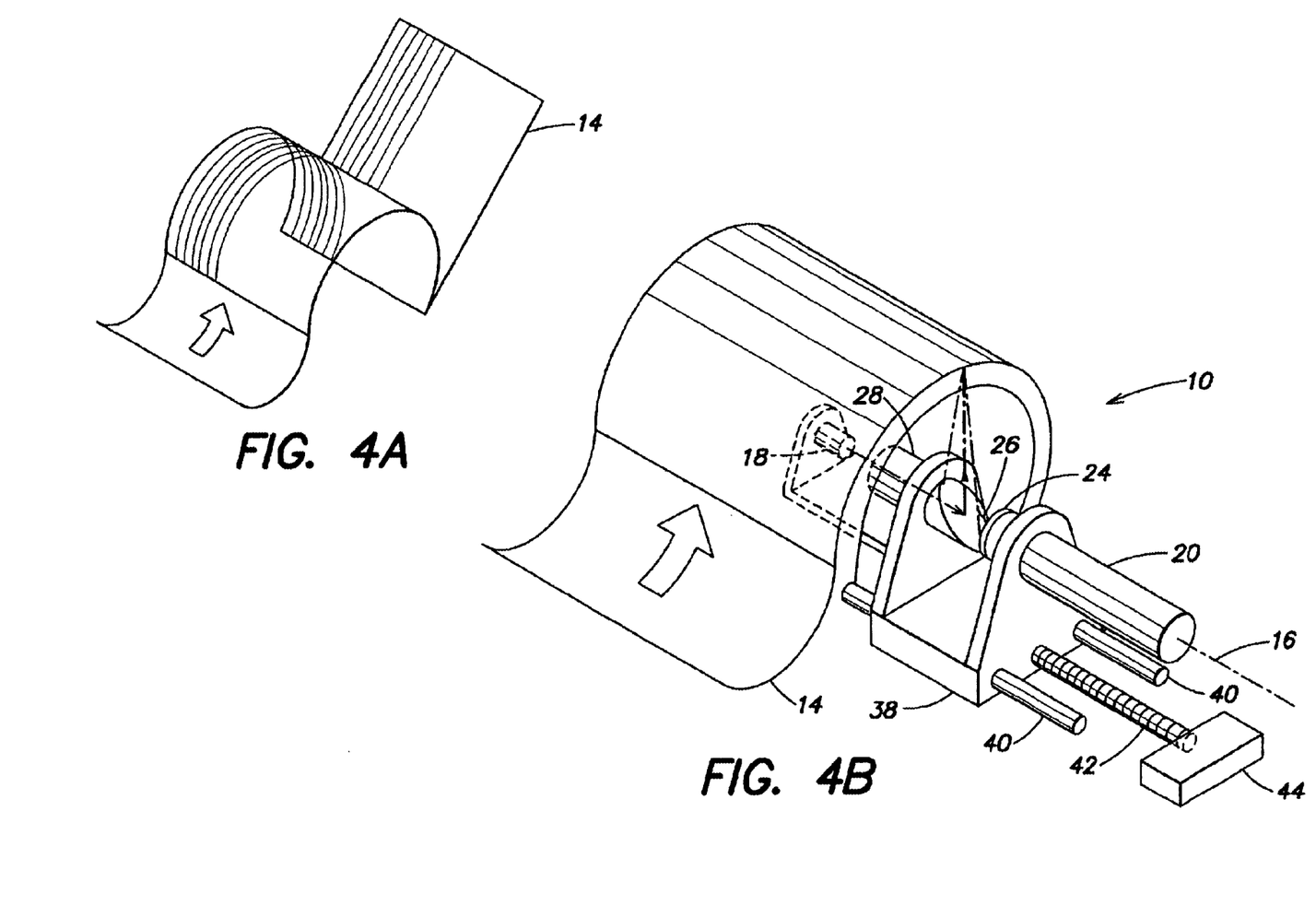
FIGS. 4A and 4B are schematic representations of a phosphor plate or film with a representation of the scan pattern thereon and a representation of a system for axial movement of the optical system, respectively.

FIGS. 4A and 4B are illustrations of a phosphor plate film 14 and the mechanism for traversing the film, respectively, during scanning whereby the rotation of the optical system 10 produces a scan path indicated by the parallel lines of FIG. 4A.

It is an advantage of the present invention that by using a fixed cylinder, the scanning medium can be mechanically fed, in contrast to scanning systems using rotating drums which require the manual attachment of the scanning medium to the face of the drum.

FIG. 4A additionally utilizes the parallel lines for depicting a chosen distance, in this case 100 micron spacing, from the previous scan. FIG. 4B illustrates the film 14 of FIG. 4A in its position in the apparatus with the hollow, cylindrical portion 12 removed for clarity. The parallel lines of the film 14 in FIG. 4B are illustrative only of the cylindrical shape of the film 14 when it is within the cylinder 12.

Schematically illustrated in FIG. 4B is the means for effecting the axial path spacing of the optical system as disclosed in FIGS. 2 and 3. A support structure or transport 38, as seen in FIG. 4B is provided with bearings, not shown, for those parts of the optical system 10, which are required to be rotated, as is conventional in the field of mechanical design. The means for movement of the optical system of this invention along its axis 16 can be selected from a variety of options, only one of which is illustrated. The support structure 38 has a pair of rods 40 for stabilization, guidance and maintenance of direction of the transport 38 in a straight line. A threaded member 42, fixed with respect to any axial movement, is engaged with mating threads in the support structure 38 for its axial movement in order to obtain the traversing for scanning of the focused spot with respect to the film 14. A linear stepping motor 44, schematically shown, provides the rotation of the threaded member to accurately space the separate scans across film 14. Although the light source 18 is only schematically depicted, it is shown as attached to the support structure 38.

Figure 5:
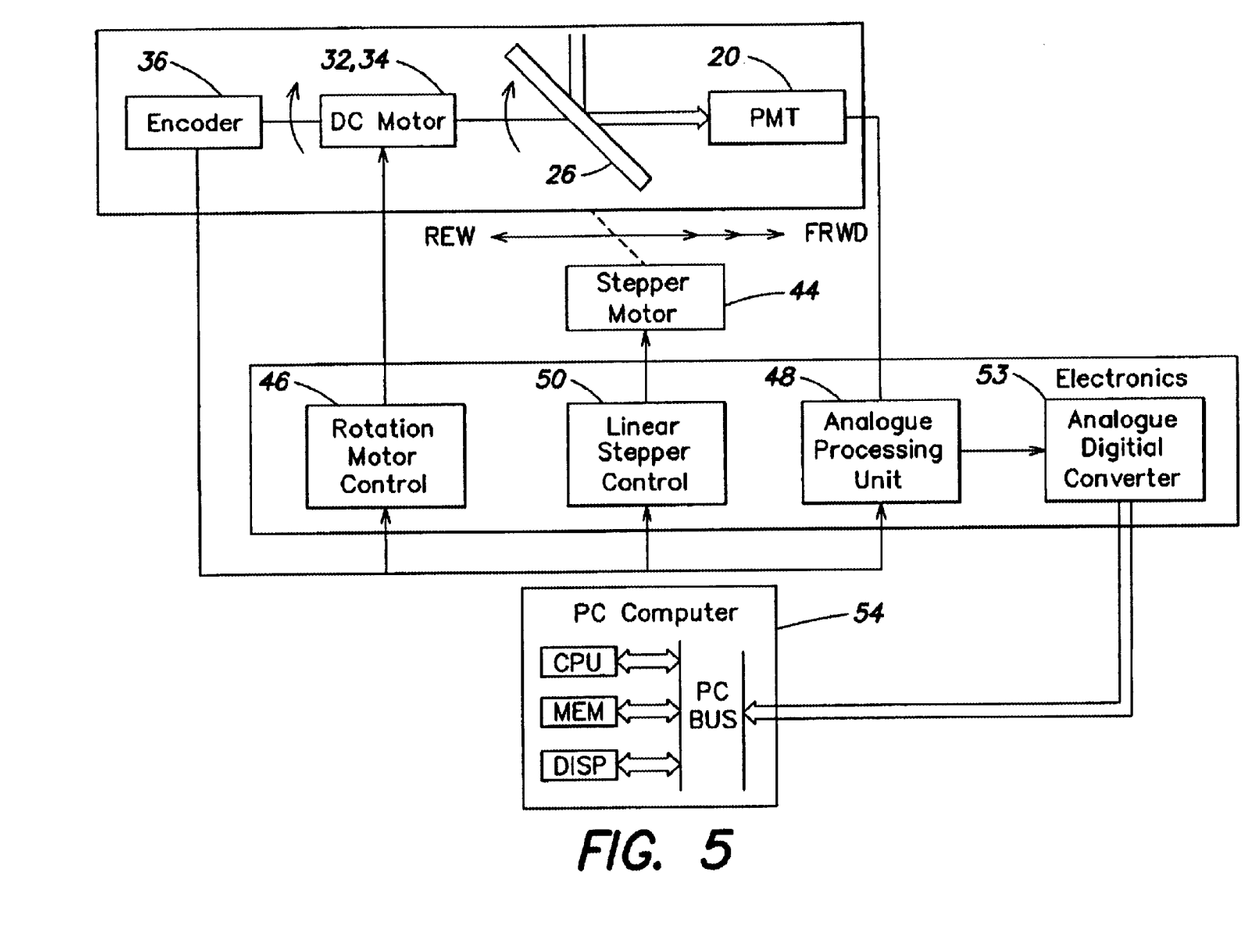
FIG. 5 is a block diagram of the control system for the operation of the optical system of this invention.

FIG. 5 is a block diagram illustrating the control of the apparatus thus far described. The DC motor 32, 34 the encoder 36 and the 45 degree angled mirror 26 are connected for simultaneous rotary operation as shown in FIG. 3, since they all are on the same shaft 28. The DC motor has a rotation motor control 46, which in turn is connected for cooperation with encoder 36. The stepper motor 44 of FIG. 4B has a linear stepper control 50, which is also connected with the output from encoder 36. The output from the detector, photomultiplier (PMT) 20 and that of encoder 36 provide input to the analog processing unit 48, which provides its output to an analog to digital converter 52 for connection with a PC computer 54.

Operation

Operation of the apparatus of this invention as a readout device involves the presentation of an X-ray exposed phosphor plate or film 14 to the interior of a fixed portion of a hollow cylinder 12 to which the phosphor plate is pressed firmly to conform to the circular configuration of the cylindrical portion without any motion ensuing while the scanning or reading is being effected. Apparatus for this purpose is well known.

The scanning operation involves the mounting of a light source such as a 635 nm laser 18 and a spinning mirror surface 26 that is angled at a suitable angle (depending on the type of rotating mirror used, as described hereinabove with respect to FIGS. 1–4) with respect to its axis of rotation 16, which is collinear with the central axis of the film 14 and its support 12. In order to bend the light beam 90 degrees and to rotate it with the mirror, the beam has to be reflected from the center of rotation of the mirror 26. The beam then forms a rotating spot on the film that follows a path of a portion of a circle on the phosphor plate 14. When the laser beam starts from between the rotating mirror 26 and the filter 24, no hole in the rotating mirror 26 is required. Whereas the laser 18, when it is behind the rotating mirror 26, requires a hole in its center with a small mirror 22 therein to supply the directing of the beam perpendicular to a spot on the film.

The support structure or transport 38 contains an optical system which includes light source 18, spinning mirror 26 and small mirror 22, when required, and its movement to traverse the phosphor plate 14 is coordinated with the rotative movement of the spot such that, when the spot reaches the end of the film 14, the cart then moves the distance of one pixel for the next scan. The spot is chosen to be, for example, 100 micron in diameter thereby forming a circular line 100 micron wide; therefore the transport 38 moves the optic system a distance of 100 micron for the next scan.

More specifically as a readout device, using phosphor plates, the following operation is effected.

Readout of a previously X-ray exposed phosphor plate is obtained by the 635 nm laser 18 stimulating the crystal layer of the phosphor plate causing it to radiate light at 390 nm as the beam spot on the film makes its scan. The rotating mirror 26 receive the emitted light around its outer periphery for reflection onto the Schott type filter 24 which is transparent to 390 nm while absorbing 635 nm light. The light passing through filter 24 is applied to detector photomultiplier tube 20, which converts the light to an electric signal that is amplified, gated to represent one pixel on the circular scan and converted to a digital number representing the brightness of the pixel. The filter 24 and detector 20 are also mounted on the transport 38.

The encoder 36 stabilizes the motor 32, 34 by feed back pulses which also control the gating of the output of the detector photomultiplier 20 to define time samples equivalent to 100 micro-meters in distance. The pulses are also used for defining, at any point in time during the scan, the angular position of rotating mirror 26 and the angle of the stimulated emission from the phosphor plate in order to activate the stepper motor for the next parallel scan. If a helical scan is required, the change would be within the skill of an ordinary technician.

Since the paths of the stimulating light and the stimulated light for all points are identical, and since the hitting and emitting angles for all scan points are perpendicular and identical, and since the scanning speed is constant and easy to maintain, there is no need for correction algorithms or compensation. Digitization resulting from the scanning action results in the ability to replicate and/or store the data from the film.

Although the invention has been illustrated in the accompanying drawings and described in the foregoing specification in terms of preferred embodiments, the invention is not limited to these embodiments. It will be apparent to those skilled in this art that certain changes, modifications and substitutions can be made without departing from the true spirit and scope of the appended claims. For example, the laser light source 18 could be mounted on the filter 24 thereby eliminating the need for small mirror 22. Furthermore, the teachings of this invention are applicable to other than a phosphor plate medium.

Figure 6:
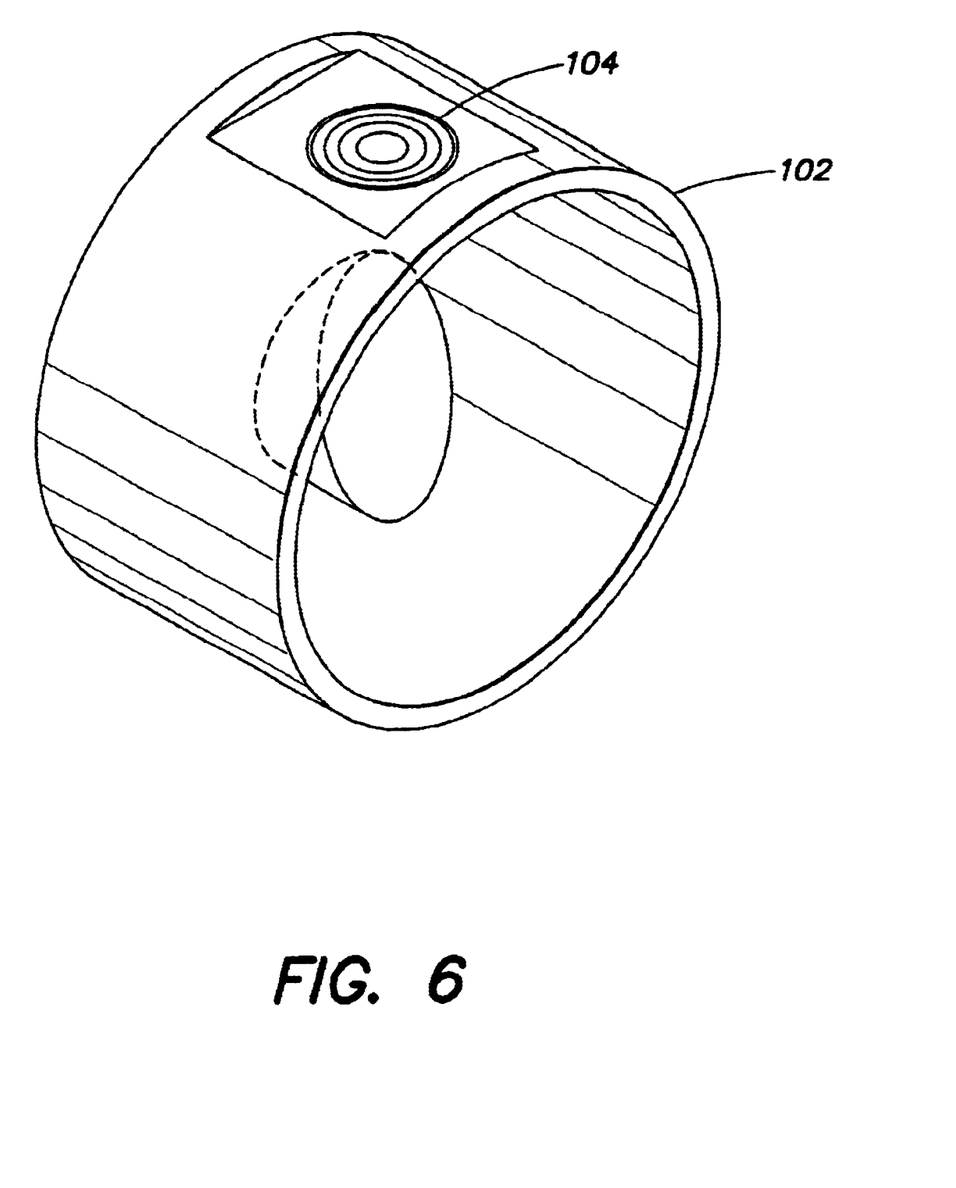
FIG. 6 is an isometric view of the optical system of a scanning apparatus constructed and operative in accordance with a further embodiment of the invention.
Figure 7:
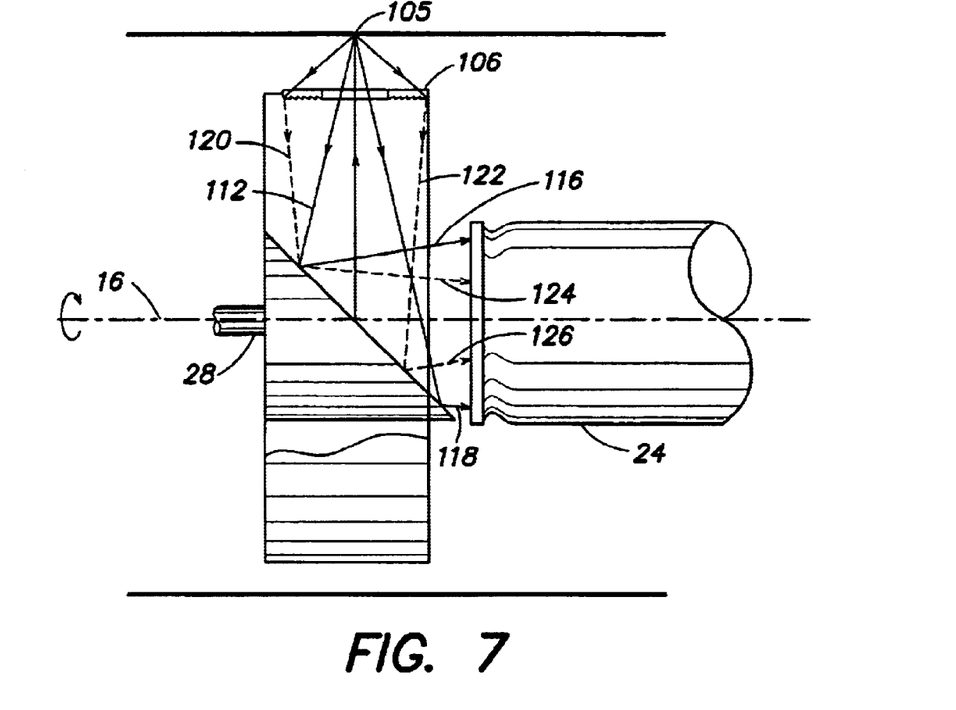
FIG. 7 is a schematic representation of the arrangement of the optical system of FIG. 6.
Figure 8:
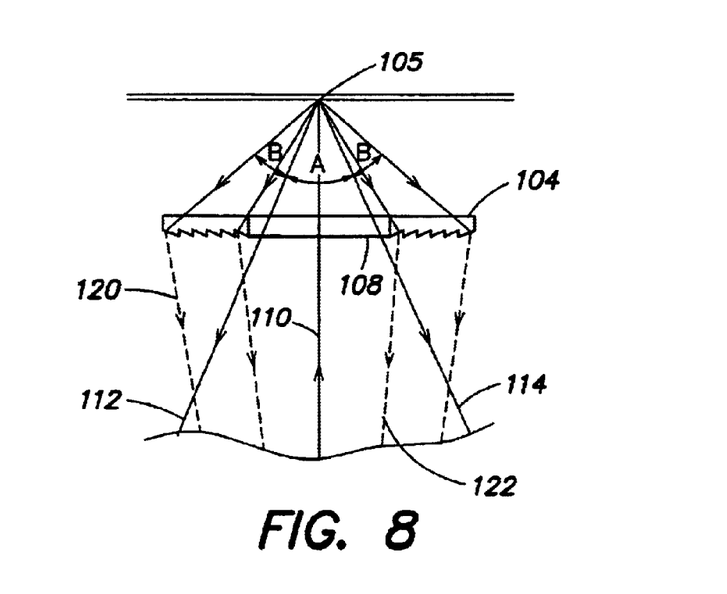
FIG. 8 is a detailed schematic representation of the Fresnel lens arrangement used in the embodiment of FIG. 6 and FIG. 9 which is a schematic representation of an alternative arrangement of the optical system of this invention.

Reference is now made to FIGS. 6–8 which illustrate a further embodiment of the scanning apparatus, generally designated 100, constructed and operative in accordance therewith. FIG. 6 shows a portion or segment of a hollow cylinder 102 (similar to hollow cylinder 12 described hereinabove). FIG. 7 is a schematic representation of the arrangement of the optical system 100 and FIG. 8 is a detailed representation of the optical arrangement.

The optical system 100 is similar to the optical system of scanning apparatus 10 described hereinabove with respect to FIGS. 1–5. Elements having similar functions as previous embodiments are similarly designated and will not be further described.

The optical system 100 comprises a hollow cylinder 102 for shaping the phosphor plate medium 14 (or similar) to be scanned on the internal face of the cylinder and the optical system shown in FIG. 3. The optical system includes a light source 18 which lies on the axis 16 of a hollow shaft 28. The hollow shaft, which is collinear with the hollow cylinder portion 102, allows the beam to pass through The angled mirror 26 has a hole 30 at its center with a small mirror 22 mounted within the hole.

In addition, optical system 100 further comprises a Fresnel lens 104, which is inserted on the coaxial cylinder 102, as shown in FIG. 8. The cylinder 102 is connected to the slanted mirror system and rotates with it, The Fresnel lens 104 is placed on the cylinder so that its longitudinal axis 106 is parallel with the central axis 16 of the laser beam.

As previously described with respect to the embodiments of FIGS. 1–5 (that is without the Fresnel lens 104), the light collection is based on a cone of stimulated light with its source at the impinging point 105 of the laser. The base of the cone is defined by the angled mirror 26 which is reflected into the detector photomultiplier (PMT) tube 20. Alternatively, the stimulated light may be directly aimed to the PMT tube 20

In order to not to obstruct the bean of light and prevent distortions, a hole 108 is drilled through the center of the Fresnel lens 104. The diameter of the hole 108 is configured so as to allow the same amount of stimulated light to pass through to the mirror and PMT as the previously described embodiments not having a lens, that is the lens 104 does obstruct the passage of any light. As best seen in FIG. 7, the impinging ray 110 is returned as rays 112 and 114, which are reflected by mirror 26 as rays 116 and 118, respectively, through filter 24 into PMT 20.

The addition of the Fresnel lens 104 expands the angle of the cone from the impinging point 105 to the rim of the Fresnel lens 104. As best seen in FIG. 8, the angle of stimulated light is increased from "A" to "A+2B". Thus, additional rays, such 120 and 122, arc refracted through the rim of the Fresnel lens 104 and then reflected by mirror 26 as rays 124 and 126, respectively, through filter 24 into PMT 20.

Thus, in this embodiment, an additional amount of light enters the PMT 20, the amount of light being proportional to the expanded angle ("A+2B"). The Fresnel lens 104 concentrates (or bends) the light reflected into its "ring" to the mirror. In other words, the addition of the Fresnel lens 104 allows an increased amount (2B) of light to be collected thereby improving the light collection efficiency of the system.

It will be appreciated that the invention is not limited to the use of a Fresnel lens but may be used with any other type of light collecting device.

Figure 9:
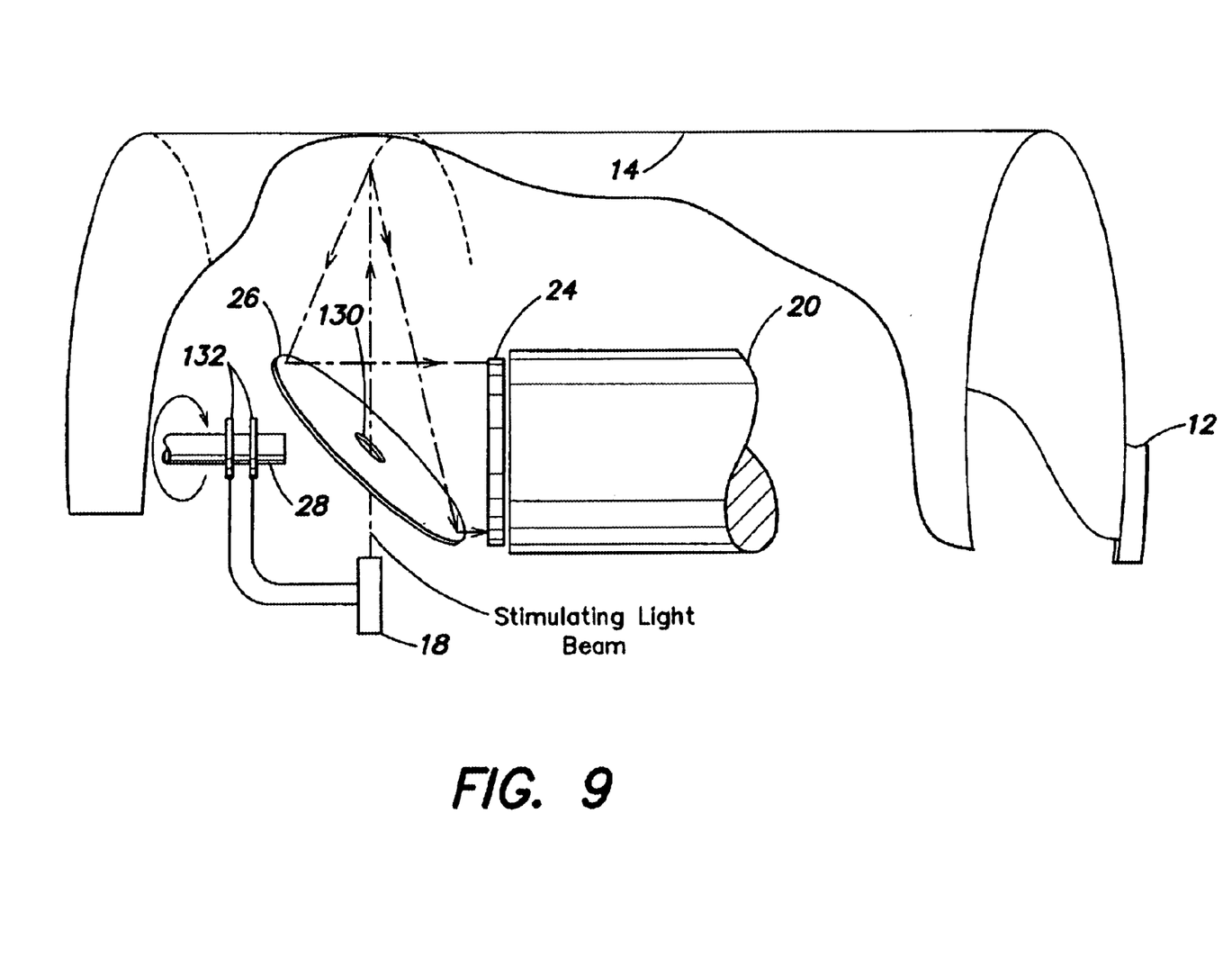

Reference is now made to FIG. 9, which is a schematic representation of a further embodiment of the present invention. This embodiment is similar to the embodiment of FIG. 2. Elements having similar functions as previous embodiments are similarly designated and will not be further described.

In the embodiment of FIG. 9, the laser source is attached to the rotating shaft 28 via slip rings 132 (known in the art) enabling power to be fed to the light source (modulator) 18. The laser beam is then directed through the hole 130 in mirror 26. The rays are reflected through filter 24 into PMT 20.

It will be further appreciated that the present invention is not limited by what has been described hereinabove and that numerous modifications, all of which fall within the scope of the present invention, exist. Rather the scope of the invention is defined by the claims, which follow:

What is claimed is:

1. An apparatus, comprising:
   a first component to reflect first radiation provided at least in a direction along a first axis off of the first axis to impinge on a sample responsive to the first radiation;
   a second component to reflect second radiation emitted from the sample in response to the first radiation, the second component arranged to receive the second radiation directly from the sample and reflect the second radiation such that it travels substantially through air.

2. The apparatus of claim 1, wherein the first component includes a rotatable reflective surface adapted to rotate about the first axis to reflect the first radiation off the first axis radially outward about the first axis.

3. The apparatus of claim 2, wherein the rotatable reflective surface is arranged to reflect first radiation off the first axis to a second axis along which the first radiation impinges on the sample.

4. The apparatus of claim 3, wherein the rotatable reflective surface is arranged to reflect first radiation off the first axis to directly impinge on the sample along the second axis.

5. The apparatus of claim 1, wherein the second component is arranged to reflect at least some second radiation in a direction having a significant vector component in a direction parallel to the first axis.

6. The apparatus of claim 1, wherein the second component has at least one reflective surface arranged such that at least some of the second radiation has reflected rays traveling in a direction substantially different from incident rays with respect to an axis perpendicular to the first axis.

7. The apparatus of claim 1, wherein the second component includes at least one reflective surface arranged to reflect second radiation in a direction non-parallel to the first axis.

8. The apparatus of claim 1, wherein the second component has a single reflective surface to reflect the first radiation outward from the first axis.

9. The apparatus of claim 1, further comprising a detector adapted to receive at least some of the second radiation.

10. The apparatus of claim 9, wherein the first radiation travels along at least a portion of the first axis in a direction away from the detector.

11. The apparatus of claim 9, wherein the second component includes at least one reflective surface arranged with respect to the detector such that at least some second radiation, when reflected from the at least one reflective surface, impinges on the detector in a direction having a significant vector component parallel to the first axis.

12. The apparatus of claim 9, wherein the detector is arranged to detect at least second radiation traveling in a direction non-parallel to the first axis.

13. The apparatus of claim 9, wherein the detector is oriented to facilitate detecting at least second radiation having a significant vector component parallel to the first axis.

14. The apparatus of claim 9, wherein the detector includes a detection surface oriented essentially perpendicular to the first axis.

15. The apparatus of claim 14, wherein the first axis passes substantially through the center of the detector.

16. The apparatus of claim 9, wherein the detector is arranged essentially symmetric about the first axis.

17. An apparatus, comprising:
a first reflective surface rotatable about a first axis to direct first radiation provided at least along a first axis off the first axis to a second axis along which the first radiation impinges on a sample responsive to first radiation; and
a second reflective surface configured to direct second radiation emitted from the sample in response to the first radiation toward a detector oriented such that, when present, at least some second radiation impinges on the detector in a direction having a significant vector component parallel to the first axis.

18. The apparatus of claim 17, wherein the second reflective surface is arranged to receive radiation directly from the sample.

19. The apparatus of claim 17, wherein air acts as a primary transmission medium for the second radiation between the sample and the detector.

20. The apparatus of claim 19, wherein the first reflective surface is arranged to direct first radiation off the first axis to directly impinge on the sample along the second axis.

21. The apparatus of claim 17, wherein the second reflective surface is arranged to cause a direction of at least some second radiation reflected from the second reflective surface to undergo a substantial change in a vector component perpendicular to the first axis.

22. The apparatus of claim 17, wherein the second reflective surface is arranged to reflect the second radiation such that a direction of some of the second radiation has a vector component perpendicular to the first axis that changes sign as a result of being reflected.

23. The apparatus of claim 17, wherein the first radiation travels along at least a portion of the first axis in a direction away from the detector.

24. The apparatus of claim 17, wherein the second reflective surface is arranged to substantially change a direction of at least some of the second radiation with respect to an axis perpendicular to the first axis to impinge on the detector.

25. The apparatus of claim 17, wherein the second reflective surface is arranged to change a sign of a vector component of a direction of the second radiation to impinge on the detector, the vector component being perpendicular to the first axis.

26. The apparatus of claim 19, wherein the detector is oriented to facilitate detecting second radiation traveling non-parallel to the first axis.

27. The apparatus of claim 19, wherein the detector includes at least one detection surface oriented essentially perpendicular to the first axis.

28. The apparatus of claim 19, wherein the first axis passes substantially through the center of the detector.

29. The apparatus of claim 19, wherein the detector is arranged essentially symmetric about the first axis.

30. An apparatus, comprising:
at least one fixed cylindrical segment adapted to conformably support a sample responsive to first radiation;
a first component to reflect first radiation provided at least along a first axis, the first component configured to direct the first radiation off the first axis to a second axis along which the first radiation impinges on the sample;
a second component to reflect second radiation emitted from the sample in response to the first radiation, the second component arranged to reflect second radiation received directly from the sample; and
a detection surface oriented essentially perpendicular to the first axis and adapted to detect at least some of the second radiation traveling in a direction non-parallel to the first axis.

31. The apparatus of claim 30, wherein the second component is arranged to receive second radiation directly from the sample.

32. The apparatus of claim 30, wherein the first component is arranged to direct first radiation off the first axis to directly impinge on the sample along the second axis.

33. The apparatus of claim 30, wherein the first component is arranged to reflect first radiation off the first axis to impinge on the sample along the second axis using a single reflective surface.

34. The apparatus of claim 33, wherein the single reflective surface is adapted to rotate about the first axis to reflect the first radiation off the first axis radially outward about the first axis to impinge on the sample.

35. The apparatus of claim 30, wherein the second component is arranged to reflect at least some second radiation in a direction having a significant vector component in a direction parallel to the first axis.

36. The apparatus of claim 35, wherein the second component has at least one reflective surface arranged such that at least some of the second radiation has reflected rays traveling in a direction substantially different from incident rays with respect to an axis perpendicular to the first axis.

37. The apparatus of claim 30, wherein the first radiation travels along at least a portion of the first axis in a direction away from the detection surface.

38. The apparatus of claim 30, wherein the second component includes at least one reflective surface arranged with respect to the detector such that at least some of the second radiation, when reflected from the at least one reflective surface, impinges on the detector in a direction having a significant vector component parallel to the first axis.

39. The apparatus of claim 30, wherein the second component includes at least one reflective surface arranged to substantially change a direction of the second radiation with respect to an axis perpendicular to the first axis to impinge on the detector.

40. The apparatus of claim 30, wherein the first axis passes substantially through the center of the detection surface.

41. The apparatus of claim 30, wherein the detection surface is arranged essentially symmetric about the first axis.

42. A method, comprising acts of:
reflecting first radiation from a first surface, the first radiation provided along at least a portion of a first axis and reflected off the first axis by the first surface to a second axis along which the first radiation impinges on a sample responsive to the first radiation;
reflecting second radiation from a second surface, the second surface arranged to reflect second radiation such that it travels substantially through air towards a detection surface oriented essentially perpendicular to the first axis; and
detecting at least some of the second radiation impinging on the detection surface in a direction non-parallel to the first axis.

43. The method of claim 42, wherein the act of reflecting second radiation includes an act of reflecting second radiation from a second surface such that at least some reflected second radiation has a significant vector component in a direction parallel to the first axis.

44. The method of claim 42, wherein the act of detecting includes an act of detecting at least some second radiation having a significant vector component parallel to the first axis.

45. The method of claim 42, wherein the act of detecting includes an act of detecting at least some second radiation traveling essentially parallel to the first axis.

46. The method of claim 42, wherein the act of detecting second radiation includes an act of detecting at least some second radiation traveling in a reflected direction substantially changed with respect to an axis perpendicular to the first axis as a result of being reflected from the second surface.

47. The method of claim 42, wherein the act of reflecting first radiation includes an act of reflecting first radiation traveling along at least a portion of the first axis in a direction away from the detection surface.

48. The method of claim 42, wherein the act of reflecting first radiation includes an act of reflecting first radiation traveling along at least a portion of the first axis in a direction towards the detection surface.

49. The method of claim 42, wherein the act of detecting includes an act of detecting at least second radiation impinging at the detection surface in a direction having a significant vector component parallel to the first axis.

50. The method of claim 42, further comprising an act of arranging the detection surface such that the first axis passes substantially through the center of the detection surface.

51. The method of claim 42, further comprising an act of arranging the detection surface essentially symmetric about the first axis.

52. The method of claim 42, wherein the act of reflecting first radiation includes reflecting first radiation from the first surface such that it directly impinges on the sample along the second axis.

53. The method of claim 52, wherein the act of reflecting first radiation includes rotating the first surface about the first axis.

54. A scanning apparatus for detecting radiation emitted from a phosphor medium, the scanning apparatus comprising:
a radiation source adapted to provide a laser beam capable of stimulating the medium;
a first component configured to receive the laser beam in a direction at least along a first axis and to direct the laser beam radially outward from the first axis to impinge on the medium;
a second component configured to reflect stimulated radiation emitted from the medium in response to the laser beam, the second component arranged to receive the stimulated radiation directly from the medium and reflect the stimulated radiation such that it travels substantially through air; and
a detector arranged substantially along the first axis to receive at least some of the stimulated radiation.

55. The scanning apparatus of claim 54, wherein the detector includes a photomultiplier tube having an opening to receive at least some of the stimulated radiation, and wherein the first axis passes through essentially a center of the opening.

56. The scanning apparatus of claim 55, wherein the detector includes a light sensitive detection surface arranged essentially perpendicular to the first axis.

57. The scanning apparatus of claim 54, further comprising at least one cylindrical segment, the at least one cylindrical segment adapted to conform the medium to a generally cylindrical shape.

58. The scanning apparatus of claim 57, wherein the at least one cylindrical segment is arranged such that the first axis is a longitudinal axis of the at least one cylindrical segment.

59. The scanning apparatus of claim 58, wherein the at least one cylindrical segment is fixed with respect to translation along the first axis.

60. A method of acquiring an image from an X-ray exposed medium, the method comprising acts of:
directing a laser beam along a first path from a laser beam source to the phosphor medium, the laser beam encountering along the first path first elements consisting of at least one first reflective component adapted to provide the laser beam along a first axis and to direct the laser beam off of the first axis to impinge on the phosphor medium such that the phosphor medium emits stimulated radiation; and
directing the stimulated radiation along second paths from the phosphor medium to a detector, at least some of the stimulated radiation encountering along the second paths second elements consisting of at least one second reflective component to direct the stimulated radiation towards the detector.

61. The of method of claim 60, further comprising an act of arranging the detector along the first axis.

62. The method of claim 61, wherein the act of arranging the detector includes an act of providing a photomultiplier tube having an opening, wherein the first axis passes through essentially a center of the opening.

63. The method of claim 60, wherein the at least one first reflective component includes a rotatable component adapted to direct the laser beam off of the first axis in directions radially outward from the first axis to impinge on the medium.

64. The method of claim 63, wherein the at least one first reflective element includes a reflective component to direct the laser beam onto the first axis in a direction towards the rotatable component.

65. The method of claim 64, wherein the act of directing the laser beam includes an act of directing the laser the beam along at least a part of the first path through an essentially hollow shaft.

66. The apparatus of claim 9, wherein the detector includes a photomultiplier tube having an opening to receive at least some of the second radiation, the opening arranged along the first axis.

67. The apparatus of claim 66, wherein the first axis passes through essentially the center of the opening.

68. The apparatus of claim 1, further comprising at least one fixed cylindrical segment adapted to couple with the sample.

69. The apparatus of claim 68, wherein the sample includes at least one phosphor plate and wherein, when present, the at least one phosphor plate substantially conforms to the at least one fixed cylindrical segment.

70. The apparatus of claim 30, further comprising a photomultiplier tube having an opening arranged along the first axis to receive at least some of the second radiation, wherein the detection surface is located within the photomultiplier tube.

71. The apparatus of claim 70, wherein the first axis passes through essentially the center of the opening.

72. The apparatus of claim 30, wherein the sample includes at least one phosphor plate and wherein the second component is arranged to reflect second radiation received directly from the at least one phosphor plate such that it travels substantially through air to the detector.

* * * * *

UNITED STATES PATENT AND TRADEMARK OFFICE
CERTIFICATE OF CORRECTION

| | |
|---|---|
| PATENT NO. | : 6,791,101 B2 |
| DATED | : September 14, 2004 |
| INVENTOR(S) | : Jacob Koren |

It is certified that error appears in the above-identified patent and that said Letters Patent is hereby corrected as shown below:

<u>Column 4,</u>
Line 30, please change "the s type" to -- the type --.

<u>Column 7,</u>
Line 43, please change "arc refracted" to -- are refracted --.

Signed and Sealed this

Twenty-first Day of December, 2004

JON W. DUDAS
*Director of the United States Patent and Trademark Office*